United States Patent Office 3,153,760
Patented Oct. 20, 1964

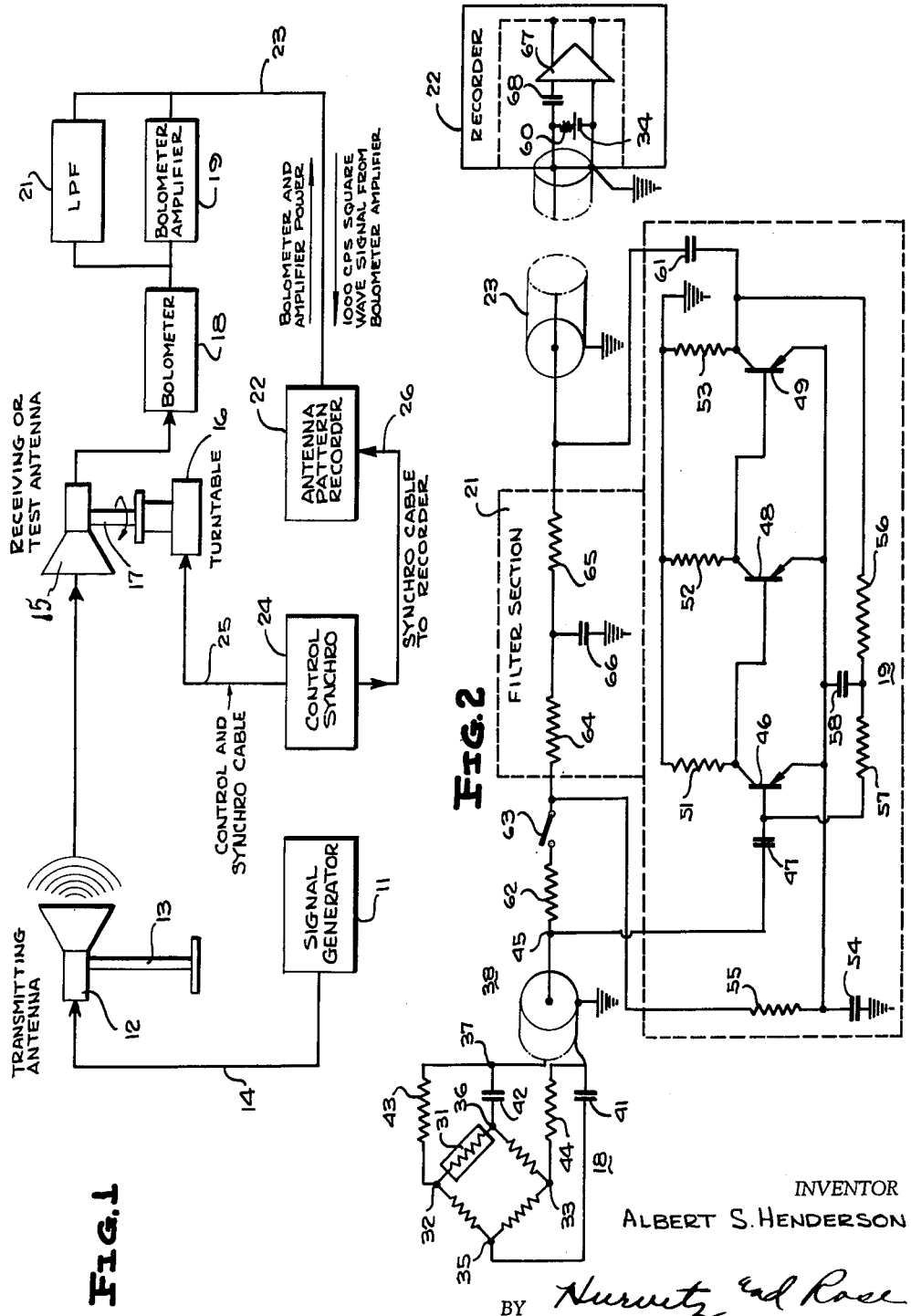

3,153,760
SIGNAL AND POWER COUPLING NETWORK
ADAPTED FOR USE PARTICULARLY WITH
ANTENNA TEST SYSTEMS
Albert S. Henderson, Melbourne, Fla., assignor to Radiation, Inc., Melbourne, Fla., a corporation of Florida
Filed Apr. 10, 1961, Ser. No. 102,028
1 Claim. (Cl. 325—67)

The present invention relates generally to testing apparatus and more particularly to systems for testing antennae and other transducers.

Previously, antenna test systems have employed bolometer detectors connected through a cable having only a pair of conductors, such as a coaxial cable, to a remotely located antenna pattern recorder. The recorder supplies power to the bolometer and receives the signal detected thereby over the single conductor pair. This arrangement has not proven completely satisfactory because remoteness between recorder and bolometer results in considerable signal attenuation due to the necessity of a relatively long transmission line. Since the cable is frequently subject to external influences, e.g., wind, vibrations of 60 cycle hum, noise level in the line is high, frequently resulting in an intolerable signal to noise ratio at the recorder input terminals. Thus, an accurate indication of the tested antenna pattern is not obtained.

Accordingly, an object of the present invention is to provide a new and improved test system for antennae and other transducers.

A further object is to provide a new and improved antenna test system which provides an accurate indication of the tested antenna pattern even though the antenna and indicator apparatus are distantly located.

Another object is to provide an antenna test system wherein the signal to noise ratio of the signal supplied to the antenna pattern recorder is sufficiently great to obtain an accurate indication of the tested antenna pattern.

Existing antenna pattern generators generally have only a single pair of terminals for supplying power to a bolometer detector and for receiving the detected signal. Consequently, it is important, for economy purposes, to employ a cable or circuit between the bolometer and recorder having only a pair of input and a pair of output terminals so existing equipment can be employed. Accordingly, an additional object is to provide a cable and circuit adapted for utilization with existing antenna test equipment, wherein the circuit and cable have only a single pair of input and output terminals while still feeding a high signal to noise ratio voltage to the antenna recorder.

Basically, the present invention employs means for transmitting a modulated radio frequency signal to the antenna being tested. A bolometer detects the R.F. signal and produces a signal commensurate with the R.F. envelope amplitude and with the modulation frequency of the signal received by the antenna. The detected signal is supplied to an amplifier, feeding one end of a suitable cable having only two leads, such as a coax, connected at its other end to the terminals of an antenna pattern recorder. The recorder supplies D.C. power to the bolometer through the same cable which supplies the amplified detected signal to it. A low pass filter is connected in parallel with the amplifier so the bolometer output signal must be supplied through the amplifier and the amplified signal is not fed back to the bolometer. This filter also feeds D.C. power from the cable to the bolometer.

The above and still further objects, features and advantages of the present invention will become apparent upon consideration of the following detailed description of one specific embodiment thereof, especially when taken in conjunction with the accompanying drawings, wherein:

FIGURE 1 is a block diagram of one preferred form of the present invention; and

FIGURE 2 is a schematic diagram of a portion of the circuitry employed in FIGURE 1.

FIGURE 1, the block diagram of the entire test arrangement, comprises signal generator 11 for supplying an appropriate radio frequency signal modulated by a suitable low-frequency source, such as a 1000 cycle square wave, by lead 14 to transmitting antenna 12, stationarily mounted on stanchion 13. Antenna 12 transmits the R.F. modulated signal to receiving or test antenna 15, rotatable by turntable 16 and shaft 17 connected therebetween. The R.F. output signal from the antenna 15 being tested is supplied to bolometer detector 18 which converts it into a signal of frequency equal to the modulating voltage of signal generator 11.

The detected output signal of bolometer 18, proportional in amplitude to the signal strength received by antenna 15, is supplied to the parallel combination of bolometer amplifier 19 and low pass filter 21. The cut-off frequency of filter 21 is below the frequency of the modulations imposed on the signal transmitted from antenna 12. Thereby, all of the detected signal is fed through bolometer amplifier 19 and none of the output signal from amplifier 19 is fed back to bolometer 18. Output signal from amplifier 19 is supplied to conventional antenna pattern recorder 22 by single cable 23 having only two leads. Recorder 22 also supplies power to amplifier 19 and bolometer 18 through the same two leads in cable 23 that feed the output signal of amplifier 19 to it. Low pass filter 21 permits D.C. power from recorder 22 and cable 23 to be supplied to bolometer 18 and amplifier 19.

Pattern recorder 22 and turntable 16 are synchronously rotated by control synchro 24, connected to receiving synchros respectively situated therein, by leads 25 and 26. As the control or transmitting synchro 24 is rotated, antenna 15 and recorder 22 are accordingly rotated. Thus, antenna 15 output signal strength varies as a function of its angle with respect to transmitting antenna 12. This signal variation determines the signal amplitude supplied by amplifier 19 and cable 23 to recorder 22 and the deflection presented by the recorder is an accurate indication of the received signal for any particular angle regardless of the remoteness between the antenna 15 and recorder 22. Miniaturized amplifier 19, situated in proximity to antenna 15, provides sufficient gain so any noise introduced in cable 23 due to external effects, such as wind, vibration, or 60 cycle hum, has minimum effect on signal to noise ratio of the signal supplied to recorder 22 input terminals.

FIGURE 2, schematically illustrating a portion of the novel circuitry employed in the receiver, comprises standard balanced bolometer bridge 18 container bolometer detector 31. D.C. power is supplied to input terminals 32 and 33 of bolometer 18 by D.C. power supply 34, contained in recorder 22, by cable 23 and filter section 21. The detected signal of bolometer 18 is obtained across output terminals 35 and 36 connected to ground and terminal 37 of conductor 38, respectively. Capacitors 41 and 42, connected between cable 38 and the bolometer output terminals, isolate terminals 35 and 36 from D.C. energization voltage while permitting the modulated detected signal to be supplied to cable 38 with virtually no attenuation. Input terminals 32 and 33 of bolometer 18 are also connected to cable 38 by isolating resistors 43 and 44, respectively, of sufficient magnitude to prevent the A.C. bolometer output signal from being fed back to input terminals 32 and 33. Cable 38, preferably of the coax type but not limited thereto, is maintained relatively short so filter section 21 and amplifier 19 are in close proximity to bolometer 18 to minimize adverse effects associated with a long cable. If possible, cable 38 is completely eliminated and amplifier 19 and filter 21 are connected directly to terminal 37. The other end of cable 38 is connected at terminal 45 to filter section 21 as well as the input terminal of amplifier 19 to supply the bolometer output signal thereto.

Amplifier 19 comprises a three stage transistorized amplifier employing D.C. coupling between the stages. The base of the first PNP transistor 46 is connected through coupling capacitor 47 to terminal 45. The collectors of transistors 46, 48 and 49 are cascaded together and are connected through load resistors 51, 52 and 53, respectively, to ground. The emitter of transistors 46, 48 and 49 are connected to smoothing capacitor 54 and one end of resistor 55. The other end of resistor 55 is connected through filter section 21 to battery 34, supplying bias to the transistors in amplifier 19. D.C. feedback only is provided between the collector of transistor 49 and the base of transistor 46 by means of the network comprising resistors 56 and 57 and capacitor 58. This feedback circuit is employed to maintain D.C. stabilization in amplifier 19 and the value of capacitor 58 is chosen so no A.C. signal is applied back to the base of transistor 46. The collector electrode of transistor 59 is connected to the inner conductor of cable 23 by coupling capacitor 61.

Isolating resistor 62 and switch 63 are connected between one terminal of filter section 21 and terminal 45 to which the inner conductor of cable 38 is connected. Resistor 62 prevents the same voltage from being supplied to the emitters of transistor stages 46, 48 and 49 as is supplied to base of the first transistor stage 46 while switch 63 is employed to control energization of bolometer bridge 18.

Low pass filter section 21 comprises a T-section having resistors 64 and 65 connected at opposite ends thereof to cables 38 and 23, respectively. Capacitor 66, connected between the junction of resistors 64 and 65 and ground, serves as a by-pass for the modulated signal from bolometer detector 18 and the output signal of amplifier 19. Thereby, filter section 21 prevents the A.C. output signal of amplifier 19 to be fed back to the bolometer terminals.

The output signal from amplifier 19 is supplied through coaxial cable 23 to a single pair of terminals on recorder 22. A.C. amplifier 67 contained in recorder 22 is the load for the amplified, detected output signal and drives the recorder pen thereby providing a visual indication of antenna 15 signal strength. Amplifier 67 is coupled to cable 23 by capacitor 68, which prevents the D.C. bias voltage 34 from being supplied to amplifier 67. Bias voltage from battery 34 is supplied through resistor 60, the inner conductor of cable 23 and the outer sheath conductor thereof to the emitters of transistors 46, 48 and 49. Resistor 60 prevents short circuiting of the A.C. signal in cable 23 through battery 34. Also, bolometer input terminals 32 and 33 are supplied from battery 34 by cable 23, resistors 64 and 65 in filter section 21 and cable 38. Accordingly, the series combination of filter section 21 and cable 23 may be considered as circuit means having only two input and two output terminals for supplying power to amplifier 19 and bolometer 18 and for supplying the detected amplified output signal of amplifier 19 to a load, recorder 22. The gain of amplifier 19 is selected so the A.C. signal fed to recorder 22 by cable 23 is of sufficient amplitude to minimize noise effects, thereby increasing signal to noise ratio supplied to the recorder.

It should be apparent that the apparatus disclosed herein may be employed with other transducers besides antennas. Also, the invention may be employed with any suitable A.C. signal generating system requiring D.C. power.

While I have described and illustrated one specific embodiment of my invention, it will be clear that variations of the details of construction which are specifically illustrated and described may be resorted to without departing from the true spirit and scope of the invention as defined in the appended claim.

What I claim is:

Apparatus for testing antenna patterns comprising means for transmitting an R.F. signal modulated at a predetermined frequency, means including the antenna being tested for receiving the R.F. signal, a bolometer bridge circuit responsive to the received R.F. signal for deriving an A.C. detected signal having a frequency equal to the predetermined frequency, a four terminal network located in proximity to said bolometer bridge, a recorder located remotely from said bolometer, said recorder including a D.C. power supply connected to a pair of terminals, said pair of terminals being the A.C. signal responsive input terminals for said recorder, a long coaxial line having only two conductors, said line connecting said pair of terminals to first and second terminals of said network, said line being the only connection between said recorder and network, third and fourth terminals of said network being connected to a pair of terminals of said bridge circuit, said network including an A.C. amplifier having a pair of signal input terminals connected to said third and fourth terminals, said amplifier signal input terminals being the A.C. signal detected by said bridge circuit, said amplifier including a pair of D.C. power input terminals responsive only to the D.C. voltage applied to said line by said D.C. power supply, said D.C. power input terminals being directly coupled to the conductors of said line, said amplifier having a pair of output terminals connected to said first and second terminals, said network including a low pass filter connected in parallel between the signal input and output terminals of said amplifier, said filter having a cut off frequency less than said predetermined frequency, and including a D.C. path for supplying D.C. voltage from said D.C. power supply to said bridge circuit via said third and fourth terminals.

References Cited in the file of this patent

UNITED STATES PATENTS

| | | |
|---|---|---|
| 2,597,297 | Corson et al. | May 20, 1952 |
| 2,602,828 | Norton | July 8, 1952 |
| 2,721,267 | Collins | Oct. 18, 1955 |
| 2,776,365 | White | Jan. 1, 1957 |
| 3,011,058 | Becker | Nov. 28, 1961 |
| 3,054,858 | Reid | Sept. 18, 1962 |
| 3,064,195 | Freen | Nov. 13, 1962 |